(12) United States Patent
Zhang et al.

(10) Patent No.: US 7,405,950 B2
(45) Date of Patent: Jul. 29, 2008

(54) MOUNTING APPARATUS FOR DATA STORAGE DEVICES

(75) Inventors: Xue-Cheng Zhang, Shenzhen (CN); Qin Guo, Shenzhen (CN); Guang-Yao Lee, Taipei Hsien (TW); Chun-Chi Liang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/558,471

(22) Filed: Nov. 10, 2006

(65) Prior Publication Data

US 2007/0279889 A1  Dec. 6, 2007

(30) Foreign Application Priority Data

Jun. 2, 2006  (CN)  ................. 2006 2 0014148 U

(51) Int. Cl.
*H05K 7/02* (2006.01)
*H05K 7/04* (2006.01)
(52) U.S. Cl. .................. 361/810; 361/685; 361/684
(58) Field of Classification Search ................ 361/685, 361/684; 248/694; 321/9.3
See application file for complete search history.

(56) References Cited

U.S. PATENT DOCUMENTS

| 6,305,660 | B1 * | 10/2001 | Liao .............................. 248/694 |
| 6,473,313 | B1 | 10/2002 | Chen et al. |
| 6,535,381 | B2 * | 3/2003 | Jahne et al. .................. 361/685 |
| 2003/0053292 | A1 * | 3/2003 | Chen ........................... 361/685 |
| 2003/0058612 | A1 * | 3/2003 | Liu et al. ..................... 361/685 |
| 2004/0179333 | A1 * | 9/2004 | Xu ............................... 361/685 |
| 2005/0094369 | A1 * | 5/2005 | Chen et al. .................. 361/685 |

* cited by examiner

*Primary Examiner*—Tuan Dinh
*Assistant Examiner*—Andargie M Aychillhum
(74) *Attorney, Agent, or Firm*—Wei Te Chung

(57) ABSTRACT

A mounting apparatus for mounting two or more types of data storage devices that each defines a locking hole in a sidewall thereof includes a bracket for holding the data storage devices, a fixing member, and a locking member. The bracket includes a first side wall. The first side wall defines a locating hole therein. The locating hole has at least two locating positions. The fixing member is pivotably mounted to the first side wall of the bracket. The locking member is selectively mounted to at least two positions of the fixing member. The locking member includes a locking portion extending therefrom, for selectively being inserted through the at least two locating positions of the locating hole of the bracket to engage in the locking hole of a corresponding type of data storage device.

17 Claims, 5 Drawing Sheets

MOUNTING APPARATUS FOR DATA STORAGE DEVICES

BACKGROUND OF THE INVENTION

1. Field of the Invention

The present invention relates to mounting apparatuses, and particularly to a mounting apparatus which readily allows securely installing or removing a data storage device to or from a computer enclosure.

2. Description of Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

Conventionally, a data storage device is attached to a drive bracket of a computer by bolts. The data storage device may, for example, be a hard disk drive, a floppy disk drive, or a CD-ROM drive. However, attachment by bolts is complicated and time-consuming, and attachment by such means requires extra work space be available inside the computer enclosure. This requirement runs counter to the trend toward miniaturization in the computer industry. Moreover, the drive bracket can only mount one type of data storage device. If it is desired to change to another type of data storage device, the drive bracket must be replaced, which is time-consuming and leads to a high cost.

What is desired, therefore, is a mounting apparatus which readily allows securely installing or removing two or more types of data storage devices to or from a computer enclosure.

SUMMARY OF THE INVENTION

An exemplary mounting apparatus for mounting two or more types of data storage devices that each defines a locking hole in a sidewall, includes a bracket for holding the two or more types of data storage devices, a fixing member, and a locking member. The bracket includes a first side wall. The first side wall defines a locating hole therein. The locating hole has at least two locating positions. The fixing member is pivotably mounted to the first side wall of the bracket. The locking member is selectively mounted to at least two positions of the fixing member. The locking member includes a locking portion extending therefrom, for selectively being inserted through the at least two locating positions of the locating hole of the bracket to engage in the locking hole of a corresponding type of data storage device.

Other advantages and novel features will become more apparent from the following detailed description when taken in conjunction with the accompanying drawings, in which:

DETAILED DESCRIPTION OF THE INVENTION

Figure 1:
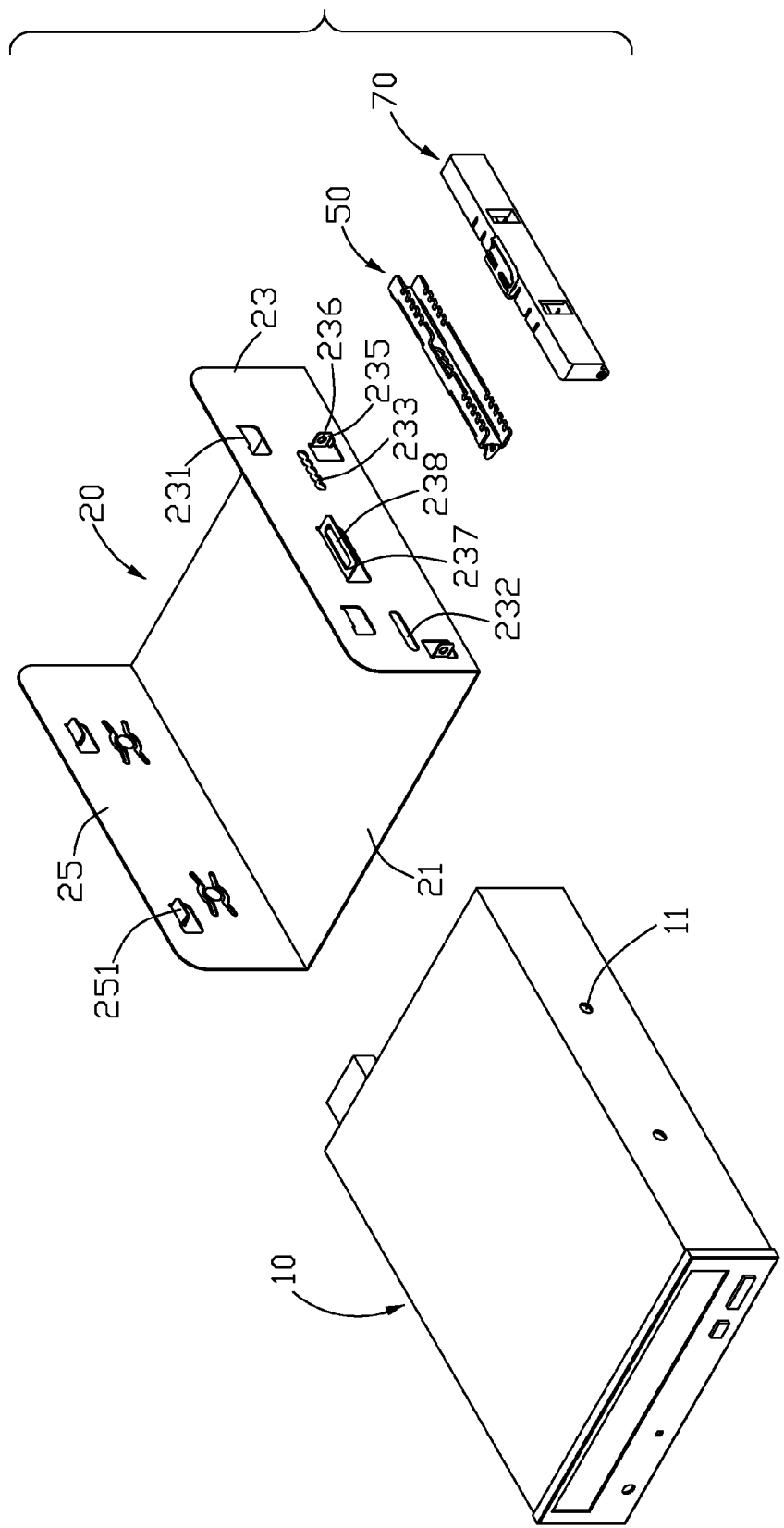
FIG. 1 is an exploded, isometric view of a mounting apparatus for a data storage device in accordance with a preferred embodiment of the present invention, together with a data storage device, the mounting apparatus includes a bracket, a locking member, and a fixing member.
Figure 2:
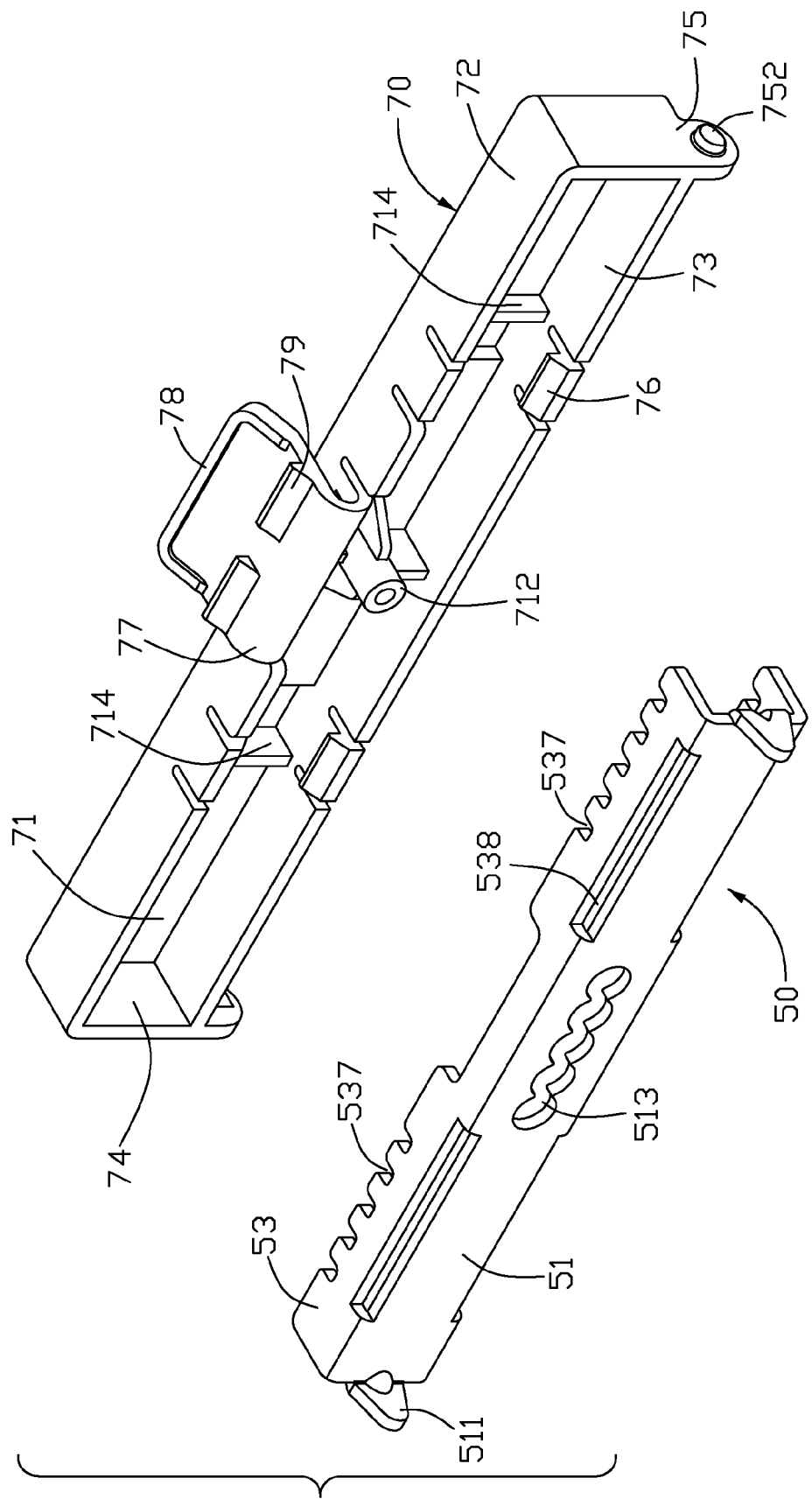
FIG. 2 is an exploded, isometric view of the locking member and the fixing member of FIG. 1, but viewed from another aspect.

Referring to FIGS. 1 and 2, a mounting apparatus of an electronic device, such as a computer, in accordance with a preferred embodiment of the present invention is shown for mounting two or more types of functional components, such as data storage devices, to an enclosure of the computer. Each data storage device 10 defines a pair of locking holes 11 in a sidewall thereof. The mounting apparatus includes a bracket 20, a locking member 50, and a fixing member 70.

The bracket 10 includes a bottom wall 21, a first side wall 23 extending up from a side of the bottom wall 21, and a second side wall 25 extending up from an opposite side of the bottom wall 21. A pair of first limiting tabs 231 parallel to the bottom wall 21 extends in from an upper portion of the first side wall 23 at opposite ends respectively. A distance between the bottom wall 21 and the pair of limiting tabs 231 is approximately equal to a thickness of the data storage device 10. A fixing tab 237 is bent out from the first side wall 23 between and below the limiting tabs 231. A fixing hole 238 is defined in the fixing tab 237. A long slot 232 and an elongated locating hole 233 are defined at opposite sides of and below the fixing tab 237. The long slot 232 is parallel to the bottom wall 21. Sides of the elongated locating hole 233 define five curved positioning portions. Two mounting tabs 235 facing each other perpendicularly extend out from a lower portion of the first side wall 23 at opposite ends. A pivot hole 236 is defined in each mounting tab 235. A pair of second limiting tabs 251 corresponding to the first limiting tabs 231 extends in from an upper portion of the second side wall 25 at opposite ends respectively.

The locking member 50 includes a main part 51. Two extension tabs 53 perpendicularly and respectively extend from ends of each of a top side and a bottom side of the main part 51. A pair of locking portions 511 extends out from opposite ends of the main pan 51 on a side opposite to the extension tabs 53. A through-hole 513 is defined in a middle of the main part 51. Top and bottom sides of the through-hole 513 define five curved position portions, which are in a line parallel to the extension tabs 53. Five restriction cutouts 537 are defined in each extension tab 53. A locking slot 538 is defined in the locking member 50 at a junction of the main part 51 and each extension tab 53.

The fixing member 70 having a box shape includes a body 71 parallel to the first side wall 23, a first side board 72 perpendicularly extending from a top side of the body 71, a second side board 73 perpendicularly extending from a bottom side of the body 71, and two end boards 74 connecting between corresponding ends of the first and second side boards 72, 73. The body 71, the first and second side boards 72, 73, and the end boards 74 together define a receiving space. A mounting tab 75 extends down from each end board 74. A pivot portion 752 extends out from each mounting tab 75. A post 712 perpendicularly extends from a middle of the body 71. Two restriction portions 714 extend from the body 71 at opposite sides of the post 712. A U-shaped resilient part 77 extends from the first side board 72. A pair of fixing portions 79 protrudes from the resilient part 77. An operating portion 78 is formed at a distal end of the resilient part 77. Two resilient hooks 76 are formed on each of the first and second side boards 72, 73.

Figure 3:
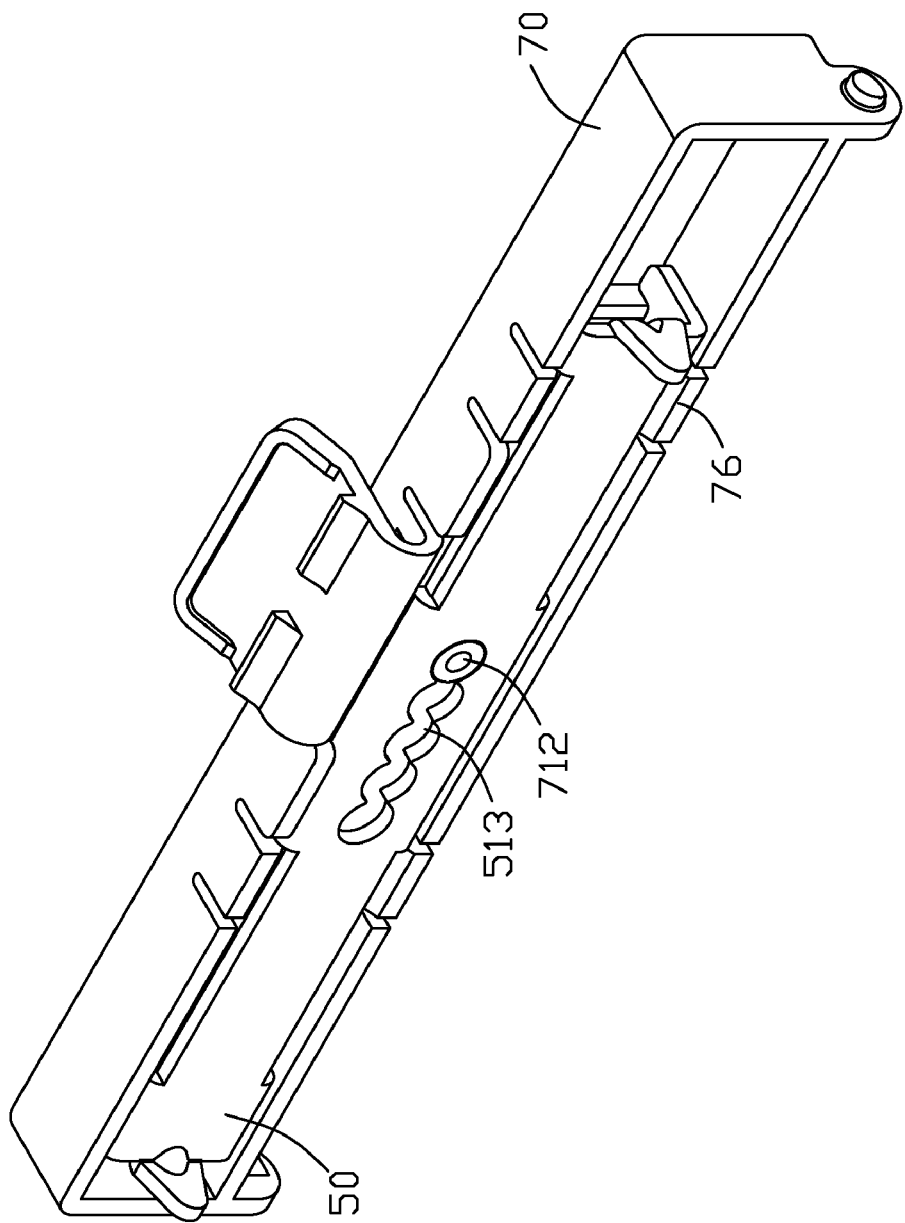
FIG. 3 is an assembled view of FIG. 2.

Referring also to FIG. 3, in assembling the locking member 50 and the fixing member 70, the locking member 50 is accommodated in the receiving space of the fixing member 70. The post 712 of the fixing member 70 is received in one of position portions of the through-hole 513 of the locking member 50. Each restriction portion 714 of the fixing member 70 is received in two corresponding cutouts 537 of two corresponding extension tabs 53 of the locking member 50. Each resilient hook 76 of the fixing member 70 is engaged in a corresponding locking slot 538 of the locking member 50.

Figure 4:
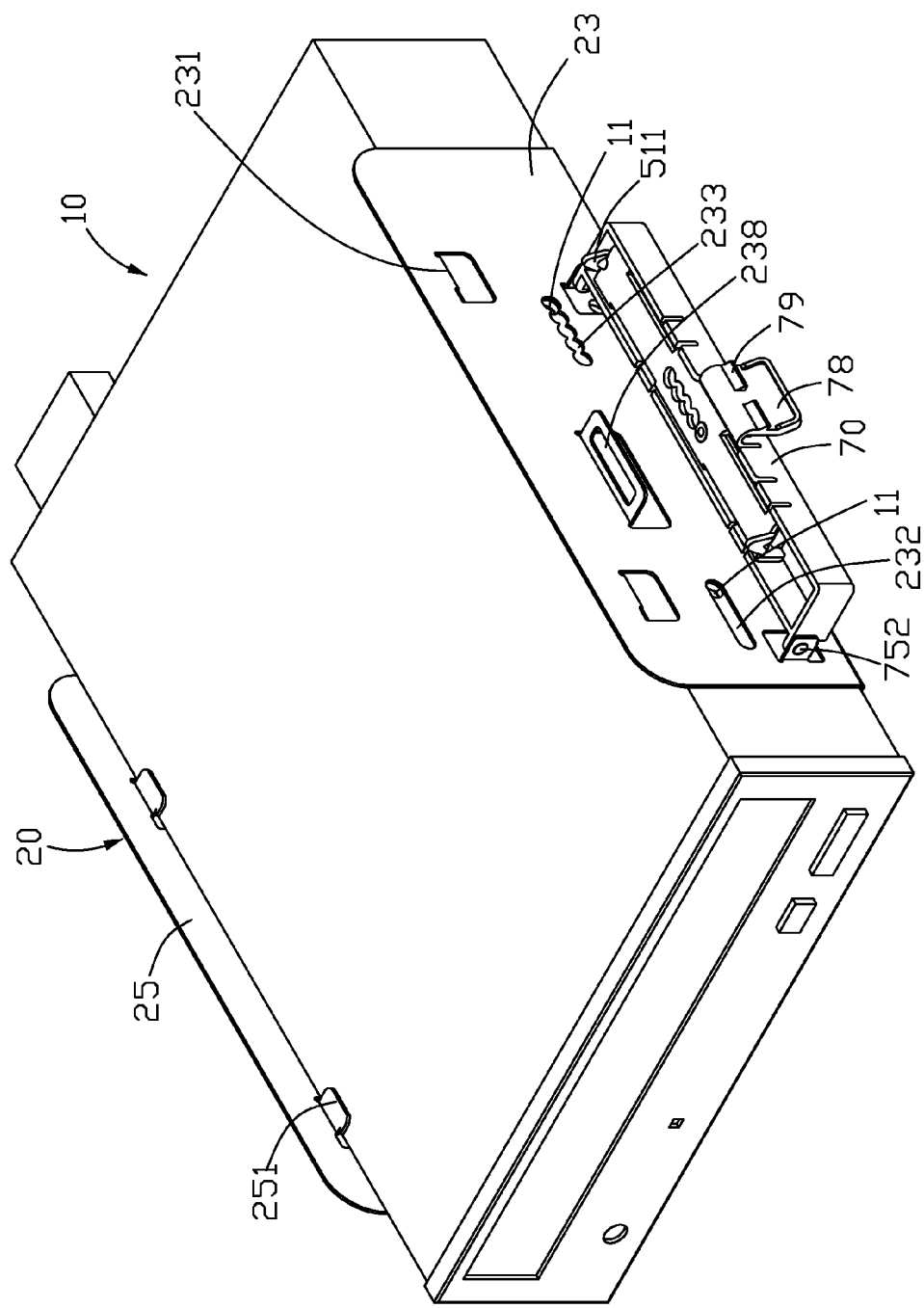
FIG. 4 is an assembled view of FIG. 1, but showing the locking member and the fixing member in unlocked states.
Figure 5:
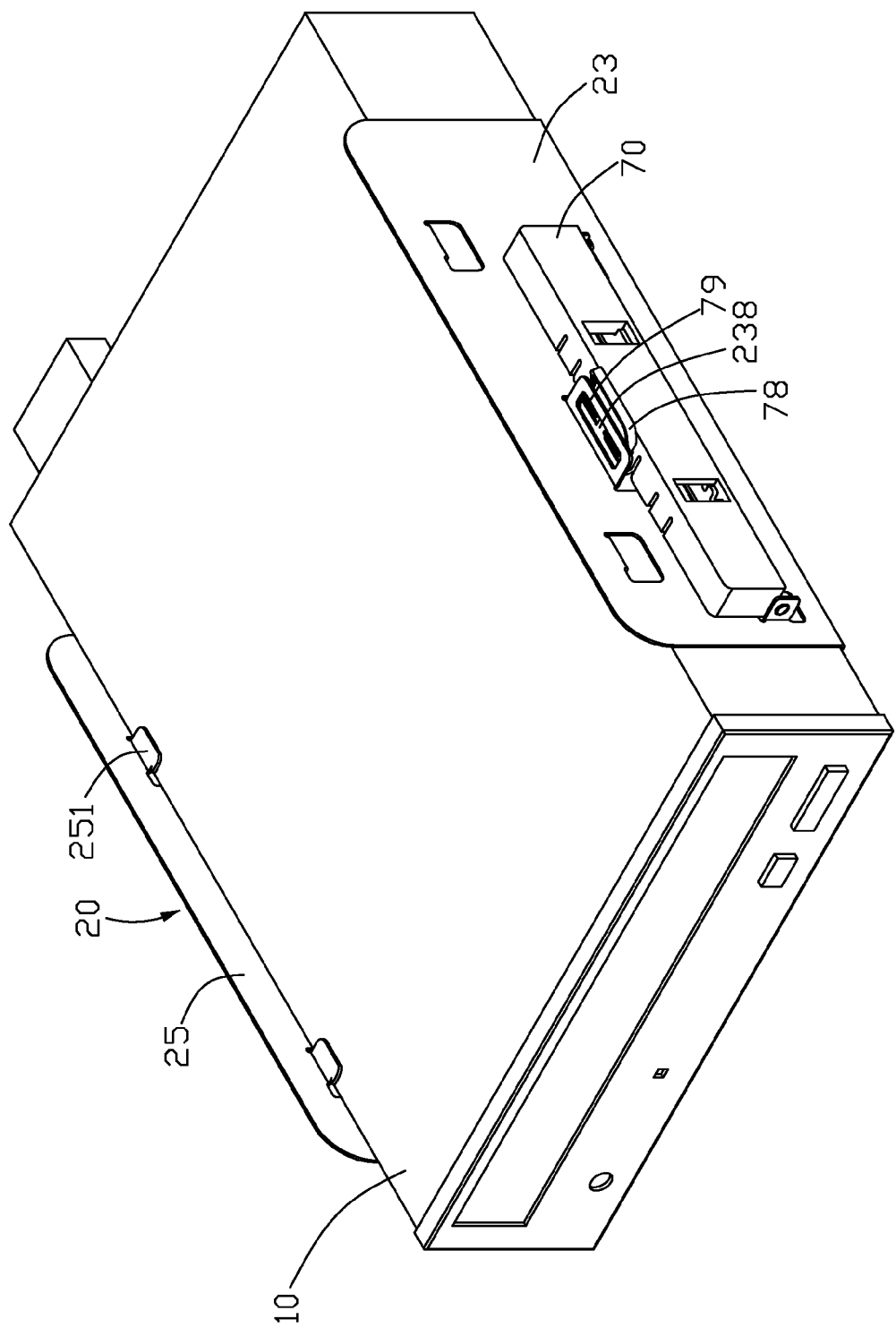
FIG. 5 is an assembled view of FIG. 1, showing the locking member and the fixing member in locked states.

Referring also to FIGS. 4 and 5, in assembling the combined assembly of the locking member 50 and the fixing member 70 to the bracket 20, the pivot portions 752 of the fixing member 70 are received in the pivot holes 236 of the corresponding mounting tabs 235 of the bracket 20. Thus, the fixing member 70 is pivotably mounted to the first side wall 23 of the bracket 20.

In preparation for mounting the data storage device 10, the locking member 50 fits about the post 712 of the fixing member 70 through a corresponding position portion of the through-hole 513 thereof, and the corresponding cutouts 537 of the locking member 50 accommodates each restriction portion 714 of the fixing member 70. In assembling the data storage device 10, the data storage device 10 is slidably placed into the bracket 20 from an end of the bracket 20 and located on the bottom wall 21 and under the limiting tabs 231, 251, with the locking holes 11 of the data storage device 10 respectively aligning with the long slot 232 and a corresponding locating position of the locating hole 233. The fixing member 70 is pivoted toward the first side wall 23 of the bracket 20. The locking portions 511 of the locking member 50 is respectively inserted through the long slot 232 and the corresponding locating position of the locating hole 233 of the first side wall 23 of the bracket 20, to engaged in the corresponding locking holes 11 of the data storage device 10. The fixing portions 79 of the fixing member 70 are engaged in the fixing hole 238 of the first side wall 23 of the bracket 20. Thus, the data storage device 10 is mounted to the bracket 20. The bracket 20, together with the locking member 50 and the fixing member 70 fix different types of data storage devices via the post 712 of the fixing member 70 locating in different positioning portions of the locking member 50.

In disassembling the data storage device 10, the operating portion 78 of the fixing member 70 is depressed to deform. The fixing portions 79 of the fixing member 70 are disengaged from the fixing hole 238. The fixing member 70 is pivoted out. The locking portions 511 of the locking member 50 are disengaged from the corresponding locking holes 11 of the data storage device 10. Thus, the data storage device 10 is easily removed from the bracket 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A mounting apparatus for mounting two or more types of data storage devices that each defines a locking hole in a sidewall thereof, the mounting apparatus comprising:
a bracket configured for selectively holding one of the two or more types of data storage devices, the bracket comprising a side wall defining a locating hole therein, the locating hole having at least two locating positions;
a fixing member pivotably mounted to the side wall of the bracket; and
a locking member selectively mounted to the fixing member in one of at least two positions of the locking member relative to the fixing member, the locking member comprising a locking portion extending therefrom, for selectively being inserted through the at least two locating positions of the locating hole of the bracket to engage in the locking hole of a corresponding type of data storage devices;
wherein the locating hole is an elongated zigzag shaped hole, each turn acting as a locating position.

2. The mounting apparatus as claimed in claim 1, wherein the fixing member comprises a body, a post extends from the body, the locking member comprises a main part, the main part defines a through-hole therein, top and bottom sides of the through-hole define at least two curved position portions that correspond to the at least two portions of locking member, for selectively accommodating the post of the fixing member.

3. The mounting apparatus as claimed in claim 1, wherein two mounting tabs extend out from the side wall of the bracket, each of the mounting tabs defines a pivot hole therein, two pivot portions extend out from opposite ends of the fixing member to be pivotably received in the corresponding pivot holes of the bracket.

4. The mounting apparatus as claimed in claim 1, wherein the fixing member comprises a body, a restriction portion extends from the body, the locking member comprises a main part, and an extension tab extending from the main part, the extension tab defines at least two cutouts therein, for selectively receiving the restriction portion of the fixing member.

5. The mounting apparatus as claimed in claim 1, wherein the locking member comprises a main part, and an extension tab extending from the main part, a locking slot is defined in the locking member at a junction of the main part and the extension tab, the fixing member comprises a body, and a side board extending from the body, a hook is formed on the side board, for engaging in the locking slot.

6. The mounting apparatus as claimed in claim 1, wherein a fixing tab is bent out from the side wall of the bracket, the fixing tab defines a fixing hole Therein, a resilient part extends from the fixing member, a fixing portion protrudes from the resilient part, for engaging in the fixing hole of the fixing tab.

7. The mounting apparatus as claimed in claim 6, wherein the fixing member comprises a body. and a side board perpendicularly extending from a top side of the body, the resilient part extends out from the side board and has a U shape.

8. An assembly comprising:
one type of two or more types of data storage devices defining a locking hole in a sidewall thereof;
A bracket for holding the two or more types of data storage devices comprising a side wall, the side wall defining a long slot therein;
a fixing member pivotably mounted to the side wall of the bracket; and a locking member selectively mounted to the fixing member in one of at least two positions of the locking member relative to the fixing member, the locking member comprising a locking portion extending therefrom, for selectively being inserted through the long slot to engage in the locking hole of a corresponding type of data storage devices;
wherein the locating hole is an elongated zigzag shaped hole, each turn acting as a locating position.

9. The assembly as claimed in claim 8, wherein the fixing member comprises a body, a post extends from the body, the locking member comprises a main part, the main part defines a through-hole therein, top and bottom sides of the through-hole define at least two curved position portions that correspond to the at least two positions of the locking member, for selectively accommodating the post of the fixing member

10. The assembly as claimed in claim 8, wherein two mounting tabs extend out from the side wall of the bracket, each of the mounting TABS defines a pivot hole therein, two pivot portions extend out from opposite ends of the fixing member to be pivotably received in the corresponding pivot holes of the bracket.

11. The assembly as claimed in claim 8, wherein the fixing member comprises a body, a restriction portion extends from the body, the locking member comprises a main part, and an extension tab extending from the main part, the extension tab defines at least two cutouts therein, for selectively receiving the restriction portion of the fixing member.

12. The assembly as claimed in claim 8, wherein the locking member comprises a main part, and an extension tab extending from the main part, a locking slot is defined in the locking member at a junction of the main part and the extension tab, the fixing member comprises a body, and a side board extending from the body, a hook is formed on the side board, for engaging in the locking slot.

13. The assembly as claimed in claim 8, wherein a fixing tab is bent out from the side wall of the bracket, the fixing tab defines a fixing hole therein, a resilient part extends from the fixing member, a fixing portion protrudes from the resilient part, for engaging in the fixing hole of the fixing tab.

14. The assembly as claimed in claim 13, wherein the fixing member comprises a body, and a side board perpendicularly extending from a top side of the body, the resilient part extends out from the side board and has a U shape.

15. An apparatus capable of mounting two or more types of data storage devices in a computer enclosure, the apparatus comprising:

a bracket configured for receiving one of the data storage devices, the bracket including a side portion defining a plurality of locating hole portions, the locating hole portions being each configured for aligning with a locking hole of a corresponding type of the data storage device when the corresponding type of the data storage device is received in the bracket;

a locking unit pivotably attached to the side portion about a pivot axis parallel to a front-to-back direction which is along the side portion of the bracket, the locking unit including a locking portion adjustably positioned thus configured for selectively extending through a corresponding one of the locating hole portions into the locking hole of the corresponding type of the data storage device;

wherein the locating hole is an elongated zigzag shaped hole, each turn acting as a locating position.

16. The apparatus of claim 15, wherein the locating hole portions are arranged along the front-to-back direction in communication with one another so as to form an elongated locating hole.

17. The apparatus of claim 15, wherein the locking unit includes a fixing member pivotably mounted to the bracket, and a locking member mounted to the fixing member, one of the fixing member and the locking member defines a plurality of through holes therein, and the other of the fixing member and the locking member forms a mounting post selectively engaging in one of the through holes.

* * * * *